Figure 1:
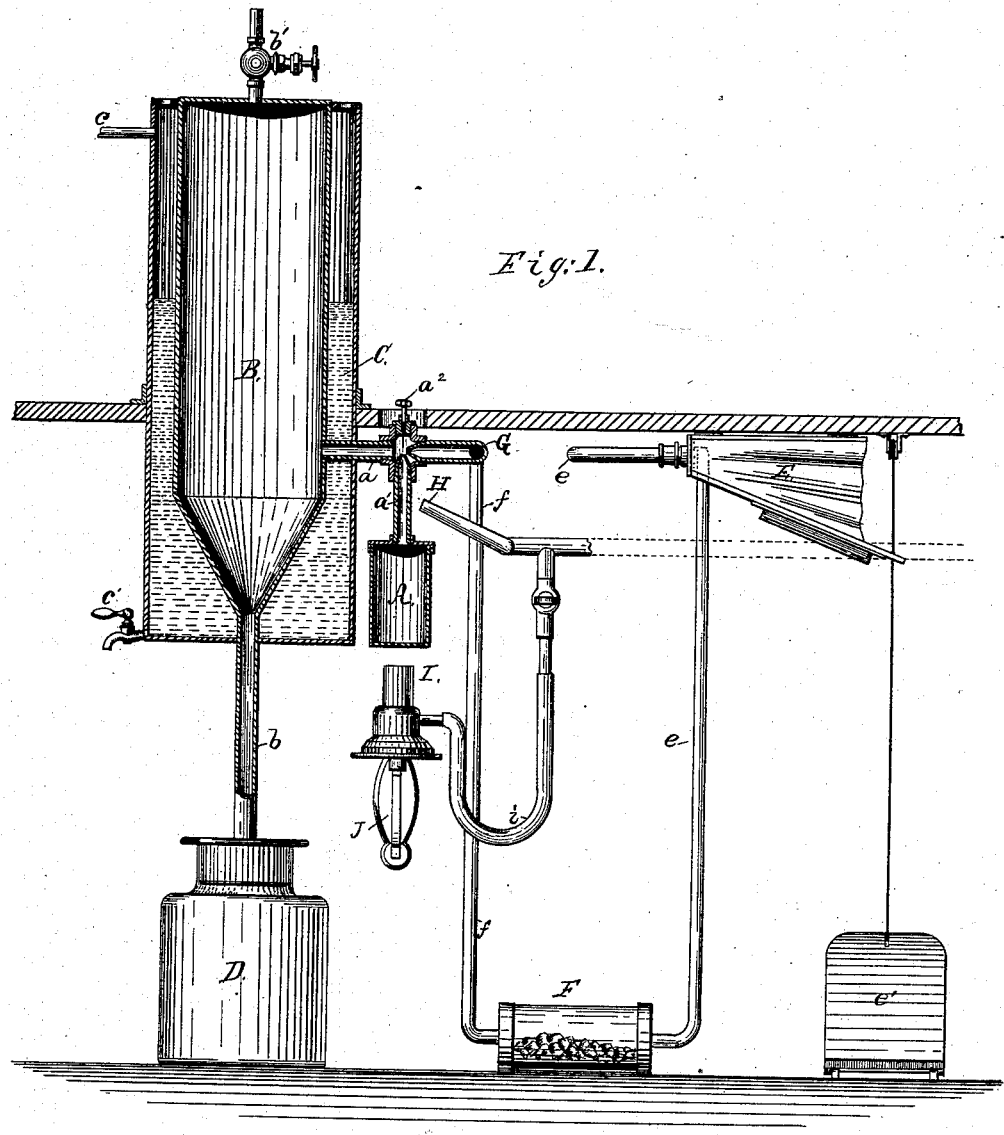

(No Model.) 2 Sheets—Sheet 1.

H. S. MAXIM.
Process of and Apparatus for Manufacturing Phosphoric Anhydride.

No. 239,394. Patented March 29, 1881.

Witnesses
Henry Hill
Clarkson A. Collins

Inventor
Hiram S. Maxim
by Leonard E. Curtis
Atty.

(No Model.) 2 Sheets—Sheet 2.

H. S. MAXIM.
Process of and Apparatus for Manufacturing Phosphoric Anhydride.

No. 239,394. Patented March 29, 1881.

Witnesses.
Henry Hine
Clarkson A. Collins

Inventor
Hiram S. Maxim
by Leonard E. Curtis
Atty

UNITED STATES PATENT OFFICE.

HIRAM S. MAXIM, OF BROOKLYN, ASSIGNOR, BY MESNE ASSIGNMENT, TO THE UNITED STATES ELECTRIC LIGHTING COMPANY, OF NEW YORK, N. Y.

PROCESS OF AND APPARATUS FOR MANUFACTURING PHOSPHORIC ANHYDRIDE.

SPECIFICATION forming part of Letters Patent No. 239,394, dated March 29, 1881.

Application filed May 8, 1880. (No model.)

*To all whom it may concern:*

Be it known that I, HIRAM S. MAXIM, of the city of Brooklyn, county of Kings, and State of New York, have invented a certain new and useful Process of Manufacturing Phosphoric Anhydride, ($P_2O_5$,) of which the following is a specification, reference being had to the accompanying drawings, which form a part hereof.

I have shown in the drawings an apparatus suitable for performing the process which I have invented; but I do not wish to be limited to the apparatus shown, as the particular form of the apparatus is not essential.

Figure 2:
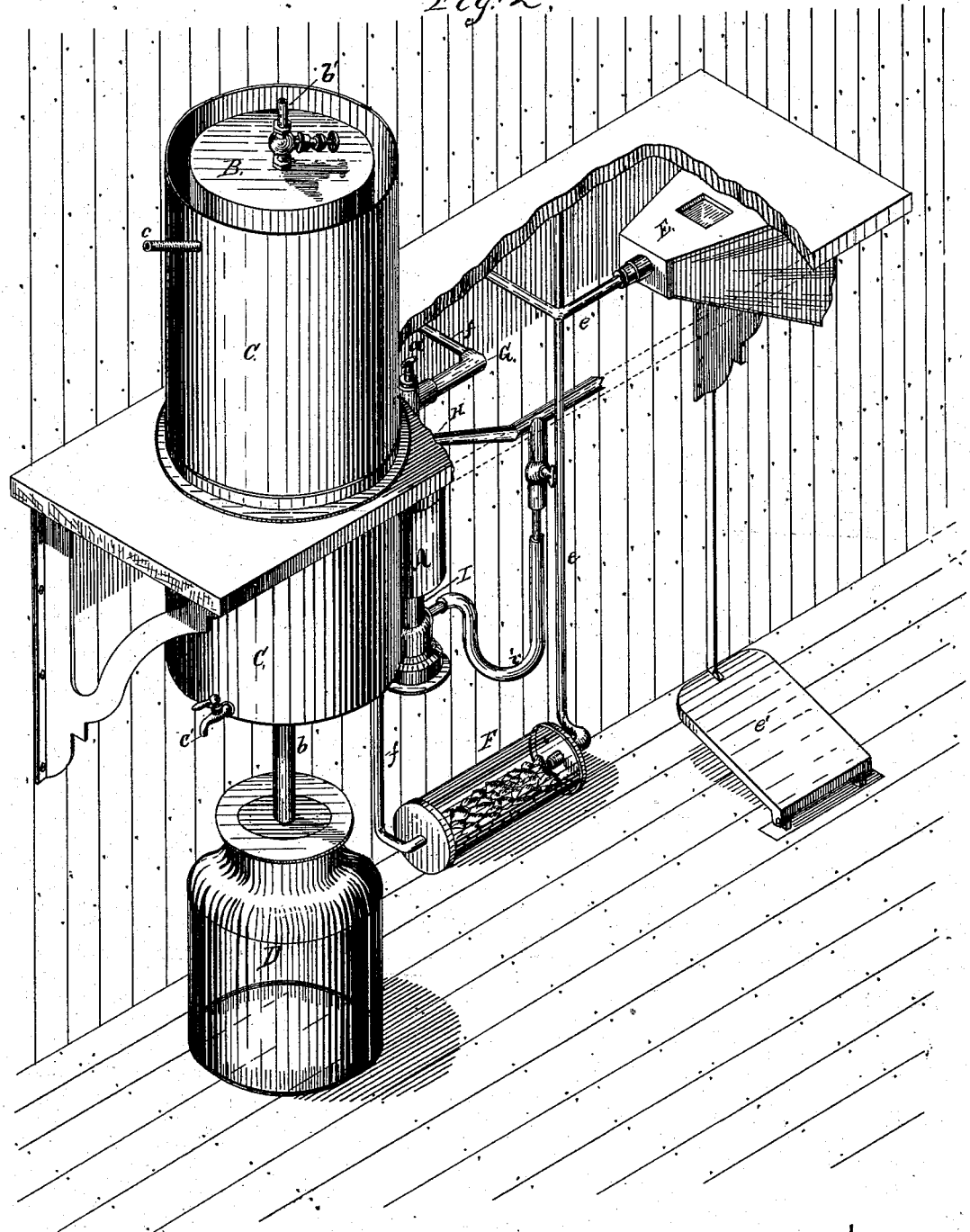

In the drawings, Figure 1 is a side elevation of the apparatus, partly in section; and Fig. 2 is a view of the same in perspective.

Similar letters of reference refer to like parts in each.

A is a closed vessel containing phosphorus.

B is a receiving-chamber for condensing and collecting the phosphoric anhydride. It has a discharge-pipe, $b$, at the lower end and a vent, $b'$, at the upper.

C is a jacket surrounding the chamber B.

D is a bottle or other suitable receiving-vessel placed under the discharge-pipe $b$.

E is a bellows or blower worked by the treadle $e'$.

F is a drying tube or chamber, filled with calcium chloride or other suitable drying material, and connected with the blower E by means of the pipe $e$.

G is an injector opening into the chamber B through the tube $a$, and connected with the chamber F by means of the pipe $f$.

H and I are Bunsen burners or gas-jets, applied to heat the vessel A and its outlet-tube $a'$.

In using the apparatus the jacket C is filled with cold water up to a point somewhat above the tube $a$, so as to keep the receiving-chamber B at a low temperature, and a strong blast of air is forced into the chamber B through the pipes $e$ and $f$ and the injector G by means of the bellows E, and is allowed to escape through the vent $b'$ until the chamber is filled with dry air, the moisture of the air supplied being thoroughly removed by the drying material in the chamber F. While the current of air is still passing the burners H and I are lighted, and heat is gradually applied to the vessel A until the phosphorus contained in it is volatilized. Care should be taken to keep the tube $a'$, and especially its upper part, at a higher temperature throughout the operation than the vessel A, so that there can be no condensation of the vapor of phosphorus after it is once formed. As the vapor passes out through the upper end of the tube $a'$ it is caught by the jet of air from the injector G and carried through the tube $a$ into the receiving-chamber B. At the same time it is thoroughly mixed with the air and enters into chemical union with its oxygen, thus forming phosphoric anhydride, which is condensed in the chamber B and falls down through the pipe $b$ into the receptacle D. The dimensions of the injector G and the tube $a$ are so adjusted that the amount of air supplied is always in excess of the quantity required for oxidizing to saturation all the phosphorus admitted, so that none of the lower oxides of phosphorus are formed. The atmospheric nitrogen and the excess of oxygen escape through the vent $b'$, and in order to insure the best results the vent should be opened sufficiently to allow them to escape freely, even if a slight amount of the anhydride is blown out by them.

The chief difficulty encountered in the processes now in use is the formation of more or less of the lower oxides on account of occasional deficiency in the supply of oxygen, and this difficulty is entirely obviated by the process above described, for as soon as the vapor of phosphorus issues from the tube $a'$ it is thoroughly mixed with a volume of free oxygen in excess of its requirements for the formation of the highest oxide, and the phosphorus takes up all the oxygen for which it has any chemical affinity.

Having described my invention, what I claim as new, and desire to secure by Letters Patent, is—

1. The process hereinbefore described of making phosphoric anhydride, which consists in bringing together a jet of vapor of phosphorus and a continuous blast of air of sufficient volume to oxidize all of such phosphorus to its highest equivalency.

2. The combination of the injector G and pipe $a$ with the blower E and vessel A and the burners H and I, arranged substantially as described.

Witnesses:        HIRAM S. MAXIM.
L. H. LATIMER,
J. F. NOBLE.